US010683396B2

(12) United States Patent
McCulloch et al.

(10) Patent No.: US 10,683,396 B2
(45) Date of Patent: Jun. 16, 2020

(54) LATEX FORMULATION WITH A MULTIVALENT METAL ION

(71) Applicants: Dow Global Technologies LLC, Midland, MI (US); Rohm and Haas Company, Collegeville, PA (US)

(72) Inventors: Bryan L. McCulloch, Phoenixville, PA (US); John A. Roper, III, Midland, MI (US); Kaitlin Rosen, Conshohocken, PA (US)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 225 days.

(21) Appl. No.: 16/037,436

(22) Filed: Jul. 17, 2018

(65) Prior Publication Data

US 2019/0023853 A1 Jan. 24, 2019

Related U.S. Application Data

(60) Provisional application No. 62/535,298, filed on Jul. 21, 2017.

(51) Int. Cl.
| | |
|---|---|
| *C08J 3/03* | (2006.01) |
| *C08F 20/18* | (2006.01) |
| *C08F 212/08* | (2006.01) |
| *C08K 3/22* | (2006.01) |
| *C08K 3/26* | (2006.01) |
| *D21H 19/20* | (2006.01) |
| *C08F 265/04* | (2006.01) |
| *B32B 27/10* | (2006.01) |
| *D21H 19/10* | (2006.01) |
| *C08L 51/00* | (2006.01) |
| *D21H 17/60* | (2006.01) |
| *D21H 19/58* | (2006.01) |
| *D21H 27/10* | (2006.01) |
| *D21H 21/16* | (2006.01) |
| *D21H 19/64* | (2006.01) |
| *D21H 21/52* | (2006.01) |

(52) U.S. Cl.
CPC ............ *C08J 3/03* (2013.01); *B32B 27/10* (2013.01); *C08F 20/18* (2013.01); *C08F 212/08* (2013.01); *C08F 265/04* (2013.01); *C08K 3/22* (2013.01); *C08K 3/26* (2013.01); *C08L 51/003* (2013.01); *D21H 17/60* (2013.01); *D21H 19/10* (2013.01); *D21H 19/20* (2013.01); *D21H 19/58* (2013.01); *D21H 19/64* (2013.01); *D21H 21/16* (2013.01); *D21H 21/52* (2013.01); *D21H 27/10* (2013.01); *C08F 2800/20* (2013.01); *C08J 2325/08* (2013.01); *C08J 2433/02* (2013.01); *C08J 2433/08* (2013.01); *C08J 2433/12* (2013.01); *C08K 2003/2244* (2013.01); *C08K 2003/2296* (2013.01)

(58) Field of Classification Search
CPC .......................................................... C08J 3/03
See application file for complete search history.

(56) References Cited

U.S. PATENT DOCUMENTS

| | | | |
|---|---|---|---|
| 4,654,397 A | 3/1987 | Mueller-Mall et al. | |
| 4,894,397 A * | 1/1990 | Morgan ............... | C08F 265/06 428/137 |
| 4,980,411 A | 12/1990 | Beckerle et al. | |
| 5,081,166 A * | 1/1992 | Kiehlbauch .......... | C08F 265/06 428/137 |
| 5,776,619 A | 7/1998 | Shanton | |
| 9,441,134 B2 | 9/2016 | Suresh et al. | |
| 10,119,040 B2 | 11/2018 | Dombrowski et al. | |
| 2004/0010071 A1* | 1/2004 | Gebhart ................. | C08L 33/00 524/523 |
| 2004/0161542 A1* | 8/2004 | Ziemann .............. | C08F 265/06 427/385.5 |
| 2007/0265391 A1* | 11/2007 | Yang .................... | C09D 133/14 524/806 |
| 2008/0081054 A1* | 4/2008 | Ilekti .................... | A45D 29/001 424/401 |
| 2014/0030535 A1* | 1/2014 | Makotky ................ | C08J 3/203 428/480 |
| 2015/0051334 A1* | 2/2015 | Wu ....................... | C09D 113/02 524/533 |

(Continued)

FOREIGN PATENT DOCUMENTS

| | | |
|---|---|---|
| JP | 2015155582 | 8/2015 |
| JP | 03776421 | 5/2016 |

(Continued)

OTHER PUBLICATIONS

Kalihari, V. et al. Rev. Sci. Instrum. 84, 035104 (2013)).
Search report from corresponding European 18184754.2 application, dated Jan. 8, 2019.

*Primary Examiner* — Megan McCulley
(74) *Attorney, Agent, or Firm* — Reid Willis

(57) ABSTRACT

The present invention relates to composition and an article prepared by applying the composition to paper. The composition comprises an aqueous dispersion of acrylic or styrene acrylic polymer particles having a hard phase and a soft phase, wherein both phases comprise structural units of an specific acid monomer. The composition further includes sub-stoichiometric levels of a $Zn^{++}$ or $Zr^{++++}$ with respect to the carboxylic acid groups. The composition is useful as imparting block and tack resistance as a coating on paper.

10 Claims, No Drawings

(56) References Cited

U.S. PATENT DOCUMENTS

| | | | |
|---|---|---|---|
| 2016/0340833 A1 | 11/2016 | Pang et al. | |
| 2017/0002517 A1 | 1/2017 | Pang et al. | |
| 2017/0283627 A1* | 10/2017 | Fu ........................ | C09D 5/028 |
| 2018/0037753 A1 | 2/2018 | Dombrowski et al. | |

FOREIGN PATENT DOCUMENTS

| | | |
|---|---|---|
| JP | 2016203982 | 12/2016 |
| WO | 2009142739 | 11/2009 |
| WO | 2013008938 | 1/2013 |

* cited by examiner

LATEX FORMULATION WITH A MULTIVALENT METAL ION

BACKGROUND OF THE INVENTION

Fluorocarbons have been used in the treatment of paper to produce oil and grease resistant (OGR) grades of paper for a wide range of applications including packaging for fast food, microwave popcorn, and bakery goods. However, various governmental agencies are mandating restrictions on the use of fluorocarbons, thereby requiring an alternative barrier material. One of the challenges for alternatives to fluorocarbons is maintenance of the low blocking properties inherent in these fluorocarbons without decreasing barrier performance.

WO 2009/142739 teaches a paper coating composition with a crosslinking agent such as zinc or zirconium and at least 2 weight percent of a high aspect ratio exfoliated nanofiller. The inclusion of this nanofiller particles is described as being critical to improvements to oil, grease, and block resistance; nevertheless, the presence of nanofillers can be deleterious for packaging applications that require creasing or folding.

Accordingly, it would be an advance in the art of paper coatings to find an environmentally acceptable alternative to formulations that include fluorocarbons or formulations requiring high aspect ratio nanofillers to achieve oil, grease, and block resistance.

SUMMARY OF THE INVENTION

The present invention addresses a need in the art by providing, in a first aspect, a composition comprising an aqueous dispersion of polymer particles having an average particle size in the range of 80 nm to 500 nm; wherein the polymer particles comprise a first phase having a $T_g$ of greater than 50° C. and a second phase having a $T_g$ of less than 35° C.; wherein the weight-to-weight ratio of the first phase to the second phase is in the range of from 5:95 to 50:50;

wherein the first phase comprises:
a) from 90 to 99 weight percent structural units of a first ethylenically unsaturated nonionic monomer; and b) from 1 to 10 weight percent structural units of a first carboxylic acid monomer;

based on the weight of structural units of the first ethylenically unsaturated nonionic monomer and the first carboxylic acid monomer;

wherein the second phase comprises:
a) from 90 to 98 weight percent structural units of a second nonionic ethylenically unsaturated monomer; and b) from 2 to 10 weight percent structural units of a second carboxylic acid monomer, based on the weight of the second nonionic ethylenically unsaturated monomer and the second carboxylic acid monomer;

wherein the polymer particles comprise from 35 to 50 weight percent of the composition;

wherein the composition further comprises from 0.05 to 5 weight percent $Zn^{++}$ or $Zr^{++++}$ ions based on the weight of the polymer particles, wherein the mole:mole ratio of the structural units of the carboxylic acid monomers to $Zn^{++}$ ions is in the range of from 7:1 to 2:1, and the mole:mole ratio of the structural units of the carboxylic acid monomers to $Zr^{++++}$ ions is in the range of from 3.5:1 to 1:1.

In another aspect, the present invention is an article comprising a papers substrate superposed by a film comprising a first domain having a $T_g$ of greater than 50° C. and a second domain having a $T_g$ of less than 35° C.; wherein the weight-to-weight ratio of the first domain to the second domain is in the range of from 5:95 to 50:50;

wherein the first domain comprises 90 to 99 weight percent structural units of a first ethylenically unsaturated nonionic monomer; and b) from 1 to 10 weight percent structural units of a first carboxylic acid monomer; based on the weight of structural units of the first ethylenically unsaturated nonionic monomer and the first carboxylic acid monomer;

wherein the second domain comprises:
a) from 90 to 98 weight percent structural units of a second ethylenically unsaturated nonionic monomer; and b) from 2 to 10 weight percent structural units of a second carboxylic acid monomer, based on the weight of the second nonionic ethylenically unsaturated monomer and the second carboxylic acid monomer;

wherein the film further comprises from 0.05 to 5 weight percent $Zn^{++}$ or $Zr^{++++}$ ions based on the weight of the structural units of the monomers, wherein the mole:mole ratio of the total structural units of methacrylic acid and acrylic acid to $Zn^{++}$ ions is in the range of from 7:1 to 2:1; and the mole:mole ratio of the structural units of the carboxylic acid monomers to $Zr^{++++}$ ions is in the range of from 3.5:1 to 1:1;

wherein the film has a coat weight thickness in the range of from 1 to 20 $g/m^2$.

The composition and article of the present invention address a need in the art by providing an environmentally acceptable paper coating formulation that affords a coating with good resistance to oil, grease, and block.

DETAILED DESCRIPTION OF THE INVENTION

In a first aspect, the present invention is a composition comprising an aqueous dispersion of polymer particles having an average particle size in the range of 80 nm to 500 nm; wherein the polymer particles comprise a first phase having a $T_g$ of greater than 50° C. and a second phase having a $T_g$ of less than 35° C.; wherein the weight-to-weight ratio of the first phase to the second phase is in the range of from 5:95 to 50:50;

wherein the first phase comprises:
a) from 90 to 99 weight percent structural units of a first ethylenically unsaturated nonionic monomer; and b) from 1 to 10 weight percent structural units of a first carboxylic acid monomer;

based on the weight of structural units of the first ethylenically unsaturated nonionic monomer and the first carboxylic acid monomer;

wherein the second phase comprises:
a) from 90 to 98 weight percent structural units of a second nonionic ethylenically unsaturated monomer; and b) from 2 to 10 weight percent structural units of a second carboxylic acid monomer, based on the weight of the second nonionic ethylenically unsaturated monomer and the second carboxylic acid monomer;

wherein the polymer particles comprise from 35 to 50 weight percent of the composition;

wherein the composition further comprises from 0.05 to 5 weight percent $Zn^{++}$ or $Zr^{++++}$ ions based on the weight of the polymer particles, wherein the mole:mole ratio of the structural units of the carboxylic acid monomers to $Zn^{++}$ ions is in the range of from 7:1 to 2:1, and the mole:mole ratio of the structural units of the carboxylic acid monomers to $Zr^{++++}$ ions is in the range of from 3.5:1 to 1:1.

As used herein, average particle size refers to the particle size of the polymer particles as determined by a Brookhaven BI-90 Plus Particle Size Analyzer. Preferably, the average particle size of the polymer particles is in the range of from 100 nm to 300 nm.

As used herein, $T_g$ refers to the glass transition temperature of a particular phase as calculated by the Fox equation. The first phase of the polymer particles is not film forming at ambient temperatures wherein the second phase is preferably film forming at ambient temperature. Preferably, the $T_g$ of the first phase is greater than 60° C., more preferably greater than 80° C., and the $T_g$ of the second phase is preferably not greater than 25° C., more preferably not greater than 15° C., and most preferably not greater than 10° C.

The first phase comprises structural units of one or more high $T_g$ monomers, that is, structural units of an ethylenically unsaturated nonionic monomer, the homopolymer of which has a calculated $T_g$ by the Fox equation of greater than 50° C., preferably greater than 60° C., and more preferably greater than 80° C. Examples of suitable high $T_g$ monomers include styrene (calculated $T_g$ of homopolymer=100° C.), methyl methacrylate (calculated $T_g$ of homopolymer=105° C.), ethyl methacrylate (calculated $T_g$ of homopolymer=65° C.), t-butyl methacrylate (calculated $T_g$ of homopolymer=118° C.), acrylamide (calculated $T_g$ of homopolymer=165° C.), acrylonitrile (calculated $T_g$ of homopolymer=125° C.), 2-vinylpyridine (calculated $T_g$ of homopolymer=104° C.), 4-vinylpyridine (calculated $T_g$ of homopolymer=142° C.), cyclohexyl methacrylate (calculated $T_g$ of homopolymer=92° C.), isobornyl methacrylate (calculated $T_g$ of homopolymer=110° C.), and vinyl chloride (calculated $T_g$ of homopolymer=81° C.). Preferably, the first phase comprises structural units of methyl methacrylate or styrene or a combination thereof.

The first phase further comprises structural units of a first carboxylic acid monomer, examples of which include acrylic acid, methacrylic acid, and itaconic acid, with methacrylic acid being preferred.

The first phase may also include structural units of a low $T_g$ monomer, that is, structural units of an ethylenically unsaturated monomer, the homopolymer of which has a $T_g$ of less than 35° C., provided the calculated $T_g$ of the first phase is greater than 50° C. Examples of low $T_g$ monomers include acrylate monomers such as methyl acrylate (calculated $T_g$ of homopolymer=10° C.), ethyl acrylate (calculated $T_g$ of homopolymer=−24° C.), n-butyl acrylate (calculated $T_g$ of homopolymer=−54° C.), 2-butyl acrylate (calculated $T_g$ of homopolymer=−26° C.), 2-ethylhexyl acrylate (calculated $T_g$ of homopolymer=−50° C.), as well as vinyl acetate (calculated $T_g$ of homopolymer=30° C.), and vinylidene chloride (calculated $T_g$ of homopolymer=−18° C.).

The first phase preferably comprises from 92, more preferably from 94 weight percent, to preferably 98, more preferably to 96 weight percent structural units of the first ethylenically unsaturated monomer based on the weight of the structural units of the first ethylenically unsaturated monomer and the first carboxylic acid monomer; and preferably from 2, more preferably from 3, and most preferably from 4 weight percent, to 8, more preferably to 7, and most preferably to 6 weight percent structural units of methacrylic acid, based on the weight of the structural units of the first monomer and the methacrylic acid.

The second phase preferably comprises from 60, more preferably from 65, and most preferably from 70 weight percent to preferably 90, more preferably to 85, and most preferably 80 weight percent structural units of a low $T_g$ acrylate monomer; preferably from 5, more preferably from 10, and most preferably from 15 weight percent, to preferably 35, more preferably to 30, and most preferably to 25 weight percent structural units of an ethylenically unsaturated second monomer other than a low $T_g$ acrylate monomer; and preferably from 2, more preferably from 3, and most preferably from 4 weight percent, to preferably 10, more preferably 8, and most preferably to 6 weight percent structural units of a carboxylic acid monomer, based on the weight of the structural units of the low $T_g$ acrylate monomer, the second nonionic ethylenically unsaturated monomer, and the carboxylic acid monomer.

Preferably, the second phase comprises a) structural units of one or more acrylate monomers selected from the group consisting of methyl acrylate, ethyl acrylate, butyl acrylate, and 2-ethylhexyl acrylate; b) structural units of a second ethylenically unsaturated nonionic monomer selected from the group consisting of styrene and methyl methacrylate; and c) structural units of acrylic acid. The weight-to-weight ratio of the first phase to the second phase is preferably from 10:90 to 35:65, more preferably to 30:70.

The sum of structural units of the carboxylic acid monomers, preferably structural units of acrylic acid in the first phase and structural units of methacrylic acid in the second phase, is preferably not more than 10, more preferably not more than 7, and most preferably not more than 5 weight percent, and preferably not less than 2, more preferably not less than 3 weight percent based on the weight of the polymer particles.

The concentration of $Zn^{++}$ ions is preferably from 0.1, more preferably from 0.2, more preferably from 0.5, and most preferably from 0.8 weight percent, preferably to 4, more preferably to 3, and most preferably to 2 weight percent, based on the weight of the polymer particles. The concentration of $Zr^{++++}$ ions is preferably from 0.05, more preferably from 0.1, and most preferably from 0.5 weight percent, preferably to 2, more preferably to 1.5, and most preferably to 1 weight percent, based on the weight of the polymer particles. The mole:mole ratio of the structural units of the first and second carboxylic acid monomers, preferably structural units of methacrylic acid in the first phase and structural units of acrylic acid in the second phase, to the $Zn^{++}$ ions is preferably from 5:1, and more preferably from 4.5:1, to preferably 2.5:1, and more preferably to 3:1. The mole:mole ratio of the total structural units of the first and second carboxylic acid monomers, preferably structural units of methacrylic acid in the first phase and structural units of acrylic acid in the second phase, to the $Zr^{++++}$ ions is preferably from 3:1, and more preferably from 2:1, to preferably 1.2:1, and more preferably to 1.5:1. As used herein, the term "concentration of $Zn^{++}$ or $Zr^{++++}$ ions" refers to the weight percent concentration of zinc or zirconium in the zinc or zirconium compound, based on the weight of dry polymer particles.

The composition of the present invention can be conveniently prepared by first synthesizing the aqueous dispersion of polymer particles (the latex) by way of a multistage emulsion polymerization process, preferably a 2-stage process, such as those well known in the art, followed by admixing the latex with a zinc compound or a zirconium compound, which generate $Zn^{++}$ or $Zr^{++++}$ ions, respectively. Examples of zinc and zirconium compounds include zinc ammonium carbonate, zinc oxide, zinc stearate, zirconium ammonium carbonate, zirconium oxide, and zirconium stearate. A zinc compound is preferred and zinc ammonium carbonate and zinc oxide are preferred zinc compounds.

The composition of the present invention preferably comprises a substantial absence of a nanofiller, especially of a nanofiller having an aspect ratio of greater than 20. Nanofillers refer to exfoliated or partially exfoliated natural or synthetic layered silicates, such as montmorillonite, bentonite, kaolinite, kaolin, mica, hectorite, sauconite, fluorohectorite, saponites, attapulgite, sepiolite, beidellite, ledikite, nontronite, volkonite, stevensite, vermiculite, halloysite, talc, pyrophillite, palygorskite, illite, phlogopite, biotite, chlorite, nacrite, dickite, suconite, magadite, kenyaite, Laponite performance additive, tainiolite, and synthetic fluoromica. As used herein, "substantial absence of nanofiller" refers to less than 5, preferably less than 1.8, more preferably less than 1, more preferably less than 0.5, and most preferably 0 weight percent nanofiller, based on the weight of polymer particles and nanofiller.

It has been discovered that the exclusion or substantial exclusion of these nanofillers improves the flexibility of the final coating, which is especially useful in flexible packaging, where folding or creasing is required. Contrary to the teachings of WO 2009/142739, it has been discovered that nanofillers are not required to achieve improved oil, grease, and block resistance, provided the polymer particles contain soft and hard phases in the prescribed ranges and the metal cation is present at or below stoichiometric levels with respect to the carboxylic acid groups.

The composition of the present invention may further include one or more ingredients selected from the group consisting of rheology modifiers; dispersants; other pigments such as $TiO_2$, calcium carbonate, and clay; defoamers; neutralizers; surfactants; solvents; additional binders; coalescents; biocides; opaque polymers; colorants; water-soluble polymers such as starch, poly(vinyl alcohol), poly(ethylene-co-vinyl alcohol), and poly(alkylene glycol); plasticizers; and waxes.

In another aspect, the present invention is an article comprising a paper substrate superposed by a film comprising a first domain having a $T_g$ of greater than 50° C. and a second domain having a $T_g$ of less than 35° C.; wherein the weight-to-weight ratio of the first domain to the second domain is in the range of from 5:95, preferably from 10:90 to 50:50, preferably to 35:65, more preferably to 30:70.

The first domain preferably comprises 90, more preferably from 92, and most preferably from 94 weight percent, to preferably 99, more preferably to 98, and most preferably to 96 weight percent structural units of a first ethylenically unsaturated nonionic monomer which is styrene or methyl methacrylate, or a combination thereof; and b) from 1 to 10 weight percent structural units of a carboxylic acid monomer, preferably methacrylic acid; based on the weight of structural units of the first monomer and the carboxylic acid monomer.

The second domain preferably comprises: a) from 60, more preferably from 65, and most preferably from 70 weight percent to preferably 90, more preferably to 85, and most preferably to 80 weight percent structural units of an acrylate which is methyl acrylate, ethyl acrylate, butyl acrylate, or 2-ethylhexyl acrylate, or a combination thereof; b) preferably from 5, more preferably from 10, and most preferably from 15 weight percent to preferably 35, more preferably to 30, and most preferably to 25 weight percent structural units of a second ethylenically unsaturated nonionic monomer which is styrene or methyl methacrylate, or a combination thereof; and c) from 2 to 10 weight percent structural units of a second carboxylic acid monomer, preferably acrylic acid; based on the weight of the acrylate, the second ethylenically unsaturated nonionic monomer, and the carboxylic acid monomer.

The film further comprises from 0.05, preferably from 0.2, more preferably from 0.5, and most preferably from 0.8, weight percent, to 5, preferably to 4, more preferably to 3, and most preferably to 2 weight percent $Zn^{++}$ or $Zr^{++++}$ ions based on the weight of the structural units of the monomers. The mole:mole ratio of the structural units of the first and second carboxylic acid monomers, preferably structural units of methacrylic acid in the first domain and acrylic acid to $Zn^{++}$ ions is in the range of from 7:1, preferably from 5:1, and more preferably from 4.5:1, to 2:1, preferably to 2.5:1, and more preferably to 3:1; and the mole:mole ratio of the structural units of the first and second carboxylic acid monomers, preferably structural units of methacrylic acid in the first domain and structural units of acrylic acid in the second domain, to $Zr^{++++}$ ions is in the range of from 3.5:1, preferably from 3:1, and more preferably from 2.5:1, to 1:1, preferably to 1.2:1, and more preferably to 1.5:1.

wherein the film has a coat weight thickness in the range of from 1, preferably from 2, and more preferably from 3, to 20, preferably to 15, and more preferably to 10 $g/m^2$.

EXAMPLES

Intermediate Example 1

Preparation of Binder with 15 wt % Hard Phase

Monomer emulsion 1 (ME1) was prepared by mixing DI water (334.4 g), Polystep B5N surfactant (5.16 g), butyl acrylate (538.0 g), styrene (148.2 g) and acrylic acid (34.2 g). Monomer emulsion 2 (ME2) was prepared by mixing DI water (56.0 g), Polystep B5N surfactant (0.84 g), methacrylic acid (8.3 g), and methyl methacrylate (118.3 g).

A 3-L reactor equipped with a mechanical stirrer, thermometer, condenser, heating mantle, and temperature controller was charged with DI water (306.0 g) and heated to 76° C. under $N_2$. Polystep B5N surfactant (1.84 g) was then added to the reactor, followed sequentially by a portion of ME1 (42.4 g) in water (20.0 g), then a solution of ammonium persulfate (1.68 g) in water (14 g).

After an initial exotherm, the reaction temperature was held at 84° C.; a cofeed initiator solution (1.62 g of ammonium persulfate in 44.0 g of DI water) was fed into the reactor at 0.16 g/min and ME1 was fed at 3.5 g/min. After 10 min, the cofeed initiator feed rate was increased to 0.32 g/min and the ME1 feed rate was increased to 7.0 g/min. When the cofeed and ME1 additions were complete, the reaction was held at 84° C. for 15 min, then cooled to 71° C.

ME2 was added to the reactor through an addition funnel, followed by sequential addition of an aqueous solution of t-butyl hydroperoxide (t-BHP, 0.68 g, 70% aqueous) and DI water (6.0 g), then an aqueous solution of ferrous sulfate heptahydrate (0.4 g, 1% aqueous), and then isoascorbic acid (IAA, 0.34 g) and DI water (14.0 g). The reaction was held adiabatically until the reaction exotherm was completed, after which time the reaction was cooled to 50° C. A solution of t-BHP (1.34 g, 70% aqueous) in DI water (12.0 g) and a solution of IAA (0.67 g) in DI water (12.0 g) were added at a rate of 0.38 g/min. After the feed additions were complete, a solution of ammonium hydroxide (9.9 g, 28% aqueous) in DI water (40.0 g) was added slowly. The reaction was cooled to room temperature and filtered through a 100-mesh screen. The final dispersion had a 44.0 weight percent solids contents and a pH of 6.4.

Intermediate Comparative Example 1

Preparation of Binder With No Hard Phase

The procedure was carried out substantially as described in Example 1 except that the second monomer emulsion was excluded. The final dispersion has 42.8% solids content and a pH of 6.1.

Intermediate Example 2

Preparation of Zinc Ammonium Carbonate Solution

Zinc oxide (50.3 g), ammonium bicarbonate (62.7 g), ammonium hydroxide (83.4 g, 28% aqueous $NH_3$) and DI water (285.0 g) were mixed for 30 min in a vessel. A transparent zinc ammonium carbonate solution was obtained and found to contain 1.28 mmol Zn/g of solution.

Example 1

Preparation of Mixture of Dispersion With Zn Additive

The polymer dispersion of Intermediate Example 1 (200 g, 0.66 mmol total carboxylic acid monomer/g of polymer, 58.1 mmol carboxylic acid groups) was added to a glass jar. Using an overhead mixer, the zinc ammonium carbonate solution (13.6 g, 17.4 mmol Zn) was added dropwise to the dispersion followed by ammonium hydroxide (0.9 g, 28% aqueous $NH_3$) and DI water (9.3 g) to adjust the final pH to 8.3 and final solids to 40.6 weight percent.

Comparative Example 1

Preparation of Mixture of Dispersion With Stoichiometric Excess of Zn

The polymer dispersion of Intermediate Example 1 (250 g, 0.66 mmol of carboxylic acid monomer/g of polymer, 72.6 mmol carboxylic acid groups) was added to a glass jar. Using an overhead mixer, the zinc ammonium carbonate solution (35.5 g, 45.4 mmol Zn) was added dropwise to the dispersion to adjust the final pH to 8.9 and final solids 39.4 weight percent.

Comparative Example 2

Preparation of pH and Solids Adjusted Dispersion, No Zn Addition

The pH and solids content of Intermediate Example 1 was adjusted by addition of ammonium hydroxide (2.9 g, 28% aqueous $NH_3$) and DI water (17.4 g) to a final pH of 8.6 and final solids of 40.0 weight percent.

Comparative Example 3

Preparation of Mixture of Dispersion With No Hard Phase and Zn

The polymer dispersion of Intermediate Comparative Example 1 (200 g, 0.65 mmol total carboxylic acid monomer/g of polymer, 57.2 mmol carboxylic acid groups) was added to a glass jar. Using an overhead mixer, the zinc ammonium carbonate solution (13 g, 16.6 mmol Zn) was added dropwise to the dispersion followed by DI water (5.7 g) to adjust the final pH to 8.4 and final solids to 39.7 weight percent.

Formulating Examples

Formulation 1 was prepared at a solids level of 38.8% by mixing a portion of the dispersion from Example 1 (147.4 g) with DI water (5.06 g) followed by addition of ACRYSOL™ ASE-60 Rheology Modifier (3.00 g, A Trademark of the Dow Chemical Company or its Affiliates) with an overhead benchtop mixer. The mixture was stirred at room temperature for 20 min, at which point the viscosity of the formulation was read using a Brookfield viscometer to be 678.8 centipoise at 100 rpm.

All formulations were adjusted to 38.5-39.0% solids and a Brookfield viscosity of 650 to 700 cP at 100 rpm.

Coated Sample Preparations

The formulation was applied in the machine direction to free sheet paper (60 $g/m^2$) using an RK automated coater equipped with a wire-wound rod to achieve designated coat weights (6 to 10 $g/m^2$). Coat weights were determined by punching out a fixed area of oven-dried coated paper (80° C. for 2 min) and subtracting the basis weight of the substrate. Coat weights were determined from an average of at least three punched out areas. Coated papers were conditioned in controlled temperature rooms according to TAPPI T 402 standard conditions for at least 4 h prior to testing.

Kit Testing of Coated Paper:

Coated substrates were tested for oil and grease resistance according to TAPPI T 559 cm-12. Prepared kit solutions, consisting of mixtures of castor oil, toluene, and heptane were applied dropwise to the coated specimens. After 15 s, any breakthrough of solvents into the coating was noted, and the solution was wiped from the substrate. Any discoloration or change in appearance to the substrate was considered a failure for that specific kit solution. A score was assigned for the highest numbered kit solution that passed the test. (0-12 with 12 being the best.)

Block Testing of Coated Paper:

Coated substrates were tested for block using a metal, spring-loaded compression apparatus. Samples of 1.5"× 2.75" coated substrate were placed either coated-to-coated or coated-to-uncoated between metal plates on the apparatus. The spring was compressed to apply a pressure of 50 psi to the substrate, and the entire apparatus was placed in an oven at 60° C. for 1 h. After 1 h, the apparatus was removed from the oven and allowed to cool at room temperature for 30 min. The cooled substrates were carefully removed and pulled apart; each interface was rated for block resistance according to the following scale:

1=substrates fall apart with no resistance
2=minimal force required to separate substrates; audible noise with separation
3=constant force required to separate sheets; approximately similar to Post-it Note
4=minimal amount of fiber tear observed
5=sheets completely glued together; significant fiber tear observed Tack Testing Procedure An automated tribometer was used to measure the tack of each coating; the tribometer and a method for testing is described in Kalihari, V. et al. Rev. Sci. Instrum. 84, 035104 (2013)). In this instance, a ⅜-inch stainless steel ball was used as the probe under a maximum normal load of 100 g. The surface tack force was measured during retraction and recorded as the maximum force occurring during retraction. The coated paper was adhered to a glass plate using double sided tape, and 3 measurements were made for each sample on different locations of the coated paper, which were averaged and used to calculate the measured standard deviation.

Table 1 illustrates the effect of polymer hard phase and Zn concentration on block resistance and tack. In the table, % Zn Neutralization refers to the moles of $Zn^{++}$ divided by the moles of total carboxylic acid groups times 200. Hard phase component % refers to the weight percent of the hard phase as a percentage of the total polymer. Stability is defined by absence of coagulation of the formulation within 5 minutes of addition of the rheology modifier.

TABLE 1

Block Resistance as a Function of Hard Phase and Zn Concentration

| Hard Phase Component % | mmol $Zn^{++}$ | mmol COOH | % Zn Neutralization | Block Resistance | Tack Force (g) | Tack Force Error (+/−) | Stable? |
|---|---|---|---|---|---|---|---|
| 0 | 0 | 0.65 | 0 | 5 | 38.0 | 2.5 | Y |
| 0 | 0.10 | 0.65 | 30 | 5 | 23.7 | 7.9 | Y |
| 0 | 0.19 | 0.65 | 60 | 5 | 17.6 | 4.0 | Y |
| 0 | 0.29 | 0.65 | 90 | 3 | 9.5 | 1.1 | Y |
| 15 | 0 | 0.66 | 0 | 5 | 6.3 | 4.2 | Y |
| 15 | 0.10 | 0.66 | 30 | 2 | 7.1 | 2.0 | Y |
| 15 | 0.20 | 0.66 | 60 | 2 | 3.4 | 1.5 | Y |
| 15 | 0.30 | 0.66 | 90 | 2 | 2.7 | 0.4 | Y |
| 15 | 0.41 | 0.66 | 125 | NA | NA | NA | N |
| 15 | 0.50 | 0.66 | 150 | NA | NA | NA | N |

The data show that block and tack are improved when polymer particles comprise a hard phase and when the formulation contains less than stoichiometric amounts of the Zn additive. Block could not be measured for formulations containing a stoichiometric excess of the Zn because the formulation quickly coagulated after addition of the rheology modifier.

The invention claimed is:

1. A composition comprising an aqueous dispersion of polymer particles having an average particle size in the range of 80 nm to 500 nm; wherein the polymer particles comprise a first phase having a $T_g$ of greater than 50° C. and a second phase having a $T_g$ of less than 35° C.; wherein the weight-to-weight ratio of the first phase to the second phase is in the range of from 5:95 to 50:50;
wherein the first phase comprises:
a) from 90 to 99 weight percent structural units of a first ethylenically unsaturated nonionic monomer; and b) from 1 to 10 weight percent structural units of a first carboxylic acid monomer; based on the weight of structural units of the first ethylenically unsaturated nonionic monomer and the first carboxylic acid monomer;
wherein the second phase comprises:
a) from 90 to 98 weight percent structural units of a second nonionic ethylenically unsaturated monomer; and b) from 2 to 10 weight percent structural units of a second carboxylic acid monomer, based on the weight of the second nonionic ethylenically unsaturated monomer and the second carboxylic acid monomer;
wherein the polymer particles comprise from 35 to 50 weight percent of the composition;
wherein the composition further comprises from 0.05 to 5 weight percent $Zn^{++}$ or $Zr^{++++}$ ions based on the weight of the polymer particles, wherein the mole:mole ratio of the structural units of the carboxylic acid monomers to $Zn^{++}$ ions is in the range of from 7:1 to 2:1, and the mole:mole ratio of the structural units of the carboxylic acid monomers to $Zr^{++++}$ ions is in the range of from 3.5:1 to 1:1.

2. The composition of claim 1 wherein the composition comprises from 0.2 to 4 weight percent of $Zn^{++}$ ions based on the weight of the polymer particles, wherein the mole:mole ratio of the structural units of the first and second carboxylic acid monomers in the polymer particles to $Zn^{++}$ ions is in the range of from 5:1 to 2.5:1.

3. The composition of claim 2 wherein the first phase comprises from 92 to 98 weight percent structural units of the first ethylenically unsaturated nonionic monomer and from 2 to 8 weight percent structural units of the first carboxylic acid monomer; wherein the second phase comprises from 60 to 90 weight percent structural units of a low $T_g$ acrylate, from 5 to 35 weight percent structural units of a second ethylenically unsaturated monomer other than an acrylate, and from 2 to 10 weight percent structural units of the second carboxylic acid monomer, based on the weight the acrylate, the second ethylenically unsaturated monomer, and the second carboxylic acid monomer.

4. The composition of claim 3 wherein the first phase comprises from 94 to 96 weight percent structural units of the first ethylenically unsaturated nonionic monomer and from 4 to 6 weight percent structural units of the first carboxylic acid monomer; wherein the first ethylenically unsaturated nonionic monomer is styrene or methyl methacrylate or a combination thereof; and wherein the first carboxylic acid monomer is methacrylic acid;
wherein the second phase comprises 65 to 85 weight percent structural units of the low $T_g$ acrylate; from 10 to 30 structural units of the second ethylenically unsaturated monomer; and from 3 to 6 weight percent structural units of the second carboxylic acid monomer; wherein the acrylate is ethyl acrylate, butyl acrylate, or 2-ethylhexyl acrylate; the second ethylenically unsaturated monomer is styrene or methyl methacrylate or a combination thereof; and wherein the first carboxylic acid monomer is acrylic acid;
wherein the weight-to-weight ratio of the first phase to the second phase is from 10:90 to 35:65.

5. The composition of claim 1 wherein first carboxylic acid monomer is methacrylic acid and the second carboxylic acid monomer is acrylic acid, wherein the sum of structural units of acrylic acid and methacrylic acid is not more than 5 weight percent, and not less than 3 weight percent based on the weight of the polymer particles, and wherein the concentration of $Zn^{++}$ ions is from 0.2 to 2 weight percent, based on the weight of the polymer particles; wherein the polymer particles having an average particle size in the range of 100 nm to 300 nm.

6. The composition of claim 5 wherein the $Zn^{++}$ ions arise from zinc ammonium carbonate or zinc oxide, wherein the concentration of the $Zn^{++}$ ions is in the range of from 0.8 to 2 weight percent, based on the weight of the polymer particles; wherein the mole:mole ratio of the total structural units of methacrylic acid and acrylic acid to the $Zn^{++}$ ions is from 4.5:1 to 3:1; and wherein the composition further comprises a rheology modifier.

7. The composition of any of claim 1 which comprises a substantial absence of a nanofiller.

8. The composition of any of claim 1 which comprises a substantial absence of a nanofiller having an aspect ratio of greater than 20:1.

9. The composition of claim 8 which comprises less than 1.8 weight percent of the nanofiller.

10. An article comprising a papers substrate superposed by a film comprising a first domain having a $T_g$ of greater than 50° C. and a second domain having a $T_g$ of less than 35° C.; wherein the weight-to-weight ratio of the first domain to the second domain is in the range of from 5:95 to 50:50;

wherein the first domain comprises 90 to 99 weight percent structural units of a first ethylenically unsaturated nonionic monomer; and b) from 1 to 10 weight percent structural units of a first carboxylic acid monomer; based on the weight of structural units of the first ethylenically unsaturated nonionic monomer and the first carboxylic acid monomer;

wherein the second domain comprises:
a) from 90 to 98 weight percent structural units of a second ethylenically unsaturated nonionic monomer; and b) from 2 to 10 weight percent structural units of a second carboxylic acid monomer, based on the weight of the second nonionic ethylenically unsaturated monomer and the second carboxylic acid monomer;

wherein the film further comprises from 0.05 to 5 weight percent $Zn^{++}$ or $Zr^{++++}$ ions based on the weight of the structural units of the monomers, wherein the mole:mole ratio of the total structural units of methacrylic acid and acrylic acid to $Zn^{++}$ ions is in the range of from 7:1 to 2:1; and the mole:mole ratio of the structural units of the carboxylic acid monomers to $Zr^{++++}$ ions is in the range of from 3.5:1 to 1:1;

wherein the film has a coat weight thickness in the range of from 1 to 20 $g/m^2$.

* * * * *